(12) United States Patent
Iyer et al.

(10) Patent No.: US 10,231,239 B2
(45) Date of Patent: Mar. 12, 2019

(54) METHOD AND APPARATUS FOR RESOLVING TIME DOMAIN CONFLICT IN DEVICE-TO-DEVICE COMMUNICATION

(71) Applicant: QUALCOMM Incorporated, San Diego, CA (US)

(72) Inventors: Ashish Iyer, San Diego, CA (US); Arvind Santhanam, San Diego, CA (US); Srinivasan Balasubramanian, San Diego, CA (US); Daniel Amerga, San Diego, CA (US); Scott Hoover, Del Mar, CA (US); Cheol Hee Park, San Diego, CA (US); Srinivasan Rajagopalan, San Diego, CA (US); Shailesh Maheshwari, San Diego, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 159 days.

(21) Appl. No.: 15/215,340

(22) Filed: Jul. 20, 2016

(65) Prior Publication Data

US 2018/0027559 A1     Jan. 25, 2018

(51) Int. Cl.
*H04W 72/04* (2009.01)
*H04W 76/14* (2018.01)
*H04L 5/00* (2006.01)

(52) U.S. Cl.
CPC ........ *H04W 72/0453* (2013.01); *H04L 5/0058* (2013.01); *H04W 76/14* (2018.02)

(58) Field of Classification Search
CPC .............................. H04W 72/04; H04W 76/02
See application file for complete search history.

(56) References Cited

U.S. PATENT DOCUMENTS 9,300,460 B2   3/2016   Hammarwall et al.
9,326,121 B2   4/2016   Yang et al.
(Continued)

FOREIGN PATENT DOCUMENTS

EP   3016465 A1   5/2016

OTHER PUBLICATIONS

Huawei et al: "Discussion on Group Priority for D2D Communication", 3GPP Draft; R1-154339, 3rd Generation Partnership Project (3GPP), Mobile Competence Centre; 650, Route Des Lucioles; F-06921 Sophia-Antipolis Cedex; =France, vol. RAN WG1, No. Beijing, China; Aug. 24, 2015-Aug. 28, 2015, Aug. 23, 2015 (Aug. 23, 2015), XP051001658, pp. 1-4, Retrieved from the Internet: URL:http://www.3gpp.org/ftp/Meetings_3GPP_SYNC/RAN1/Docs/.
(Continued)

*Primary Examiner* — Brandon M Renner
(74) *Attorney, Agent, or Firm* — Arent Fox, LLP

(57) ABSTRACT

Device-to-device operations are scheduled based on receive and transmit pools that may have a conflict in time domain. In an aspect of the disclosure, a method, a computer-readable medium, and an apparatus for resolving time domain conflict in device-to-device communication are provided. The apparatus may compute a first block rate metric for a first device-to-device communication on a first frequency and a second block rate metric for a second device-to-device communication on a second frequency. The apparatus may detect a time-domain conflict between the first device-to-device communication on the first frequency and the second device-to-device communication on the second frequency. The apparatus may prioritize the first device-to-device communication on the first frequency and the second device-to-device communication on the second frequency based on the first block rate metric and the second block rate metric.

20 Claims, 16 Drawing Sheets

(56) References Cited

U.S. PATENT DOCUMENTS

| | | | |
|---|---|---|---|
| 2008/0268861 A1* | 10/2008 | Buracchini | H04W 24/02 |
| | | | 455/452.1 |
| 2009/0124261 A1* | 5/2009 | Shimomura | H04W 72/082 |
| | | | 455/436 |
| 2015/0043446 A1 | 2/2015 | Tsirtsis et al. | |
| 2015/0057011 A1* | 2/2015 | Di Girolamo | H04W 74/0808 |
| | | | 455/454 |
| 2015/0319737 A1 | 11/2015 | Cheng et al. | |
| 2016/0128115 A1 | 5/2016 | Panteleev et al. | |
| 2016/0295623 A1* | 10/2016 | Kazmi | H04W 76/14 |
| 2017/0071008 A1* | 3/2017 | Sunay | H04W 72/121 |

OTHER PUBLICATIONS

LG Electronics et al: "WF on D2D Resource Collision", 3GPP Draft; R1-144440, 3rd Generation Partnership Project(3GPP), Mobile Competence Centre; 650, Route Des Lucioles; F-06921, Sophia-Antipolis Cedex; France, vol. RAN WG1, No. Ljubljana, Slovenia; Oct. 6, 2014-Oct. 10,2914, Oct. 9, 2014 (Oct. 9, 2014), XP050896128, Slides 1-3, Retrieved from the Internet: URL:http://www.3gpp.org/ftpjtsg ran/WG1_RL1/TSGR1 78b/Docs/.

Partial International Search Report—PCT/US2017/042655—ISA/EPO—Sep. 28, 2017.

International Search Report and Written Opinion—PCT/US2017/042655—ISA/EPO—Nov. 14, 2017.

LG Electronics: "Issues on Multiplexing of WAN and D2D", 3GPP Draft; R1-141354, 3rd Generation Partnership Project (3GPP), Mobile Competence Centre; 650, Route Des Lucioles; F-06921 Sophia-Antipolis Cedex; France, vol. RAN WG1, No. Shenzhen, China; Maar. 30, 2014, XP050787026, Retrieved from the Internet: URL:http://www.3gpp.org_ftp/Meetings_3GPP_SYNC/RAN1/Docs/ [retrieved on Mar. 30, 2014], 10 pages.

QUALCOMM Incorporated: "Remaining Details of D2D and WAN Multiplexing", 3GPP Draft; R1-145071, 3rd Generation Partnership Project(3GPP), Mobile Competence Centre; 650, Route Des Lucioles; F-06921, Sophia-Antipolis Cedex; France, vol. RAN WG1, No. San Francisco, USA; Nov. 8, 2014, XP050885710, Retrieved from the Internet: URL:http://www.3gpp.org/ftp_tsg_ran/WG1_RL1/TSGR1_79/Docs/ [retrieved on Nov. 8, 2014], 4 pages.

* cited by examiner

METHOD AND APPARATUS FOR RESOLVING TIME DOMAIN CONFLICT IN DEVICE-TO-DEVICE COMMUNICATION

BACKGROUND

Field

The present disclosure relates generally to communication systems, and more particularly, to device-to-device (D2D) communication.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

In device-to-device (D2D) communication, receive (RX) and transmit (TX) operations are scheduled based on RX and TX pools that may have a conflict in time domain. For example, D2D operations on one frequency may conflict with D2D operations on another frequency. As a result, each frequency may not get a fair allocation to D2D operations. In addition, a user equipment (UE) capable of performing D2D operations may adhere to wireless wide area network (WWAN) operations, which may have a time domain conflict with D2D operations. For example, D2D operations on one frequency may conflict with WWAN operations on the same frequency or another frequency. WWAN operations may have a higher priority over D2D operations. Thus, D2D operations may be starved.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

D2D RX and TX operations are scheduled based on RX and TX pools that may have a conflict in time domain. For example, D2D operations on one frequency may conflict with D2D operations on another frequency. There needs to be an optimized approach by which each frequency gets a fair allocation to D2D operations. In addition, a UE capable of performing D2D operations may adhere to WWAN operations, which may have a time domain conflict with D2D operations. For example, D2D operations on one frequency may conflict with WWAN operations on the same or another frequency. The WWAN operations may have a higher priority over the D2D operations. A resolution is needed to invert priority in certain selected cases such that a starving D2D operation may be prioritized over a WWAN operation, while minimizing impact on WWAN tasks.

In an aspect of the disclosure, a method, a computer-readable medium, and an apparatus for wireless communication are provided. The apparatus may compute a first block rate metric for a first device-to-device communication on a first frequency and a second block rate metric for a second device-to-device communication on a second frequency. The apparatus may detect a time-domain conflict between the first device-to-device communication on the first frequency and the second device-to-device communication on the second frequency. The apparatus may prioritize the first device-to-device communication on the first frequency and the second device-to-device communication on the second frequency based on the first block rate metric and the second block rate metric.

In one aspect of the disclosure, an apparatus for wireless communication is provided. The apparatus includes means for computing a first block rate metric for a first device-to-device communication on a first frequency and a second block rate metric for a second device-to-device communication on a second frequency. The apparatus includes means for detecting a time-domain conflict between the first device-to-device communication on the first frequency and the second device-to-device communication on the second frequency. The apparatus includes means for prioritizing the first device-to-device communication on the first frequency and the second device-to-device communication on the second frequency based on the first block rate metric and the second block rate metric. The apparatus may include means for performing one of the first device-to-device communication on the first frequency or the second device-to-device communication on the second frequency that has a higher priority during subframes in which the time-domain conflict occurs. The apparatus may include means for abstaining from performing one of the first device-to-device communication on the first frequency or the second device-to-device communication on the second frequency that has a lower priority during subframes in which the time-domain conflict occurs.

In an aspect of the disclosure, a method, a computer-readable medium, and an apparatus for wireless communication are provided. The apparatus may detect a perpetual collision between a WWAN communication and a device-to-device communication. The apparatus may avoid the perpetual collision between the WWAN communication and the device-to-device communication.

In one aspect of the disclosure, an apparatus for wireless communication is provided. The apparatus includes means for detecting a perpetual collision between a WWAN communication and a device-to-device communication. The apparatus includes means for avoiding the perpetual collision between the WWAN communication and the device-to-device communication. In one configuration, the means for avoiding the perpetual collision between the WWAN communication and the device-to-device communication may be configured to determine an offset of a discovery period relative to a particular subframe based on a random number. In one configuration, the means for avoiding the perpetual collision between the WWAN communication and the device-to-device communication may be configured to detect a page at a first paging occasion and prioritize the device-to-device communication over the WWAN communication at a second paging occasion that is a plurality of paging occasions after the first paging occasion. In one configuration, the means for avoiding the perpetual collision between the WWAN communication and the device-to-device communication may be configured to start a background timer in response to the detecting of the perpetual collision and prioritize the device-to-device communication over the WWAN communication when the background timer expires. In one configuration, the means for avoiding the perpetual collision between the WWAN communication and the device-to-device communication may be configured to compute a block rate metric for the device-to-device communication in response to the detecting of the perpetual collision and prioritize the device-to-device communication over the WWAN communication when the block rate metric exceeds a threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
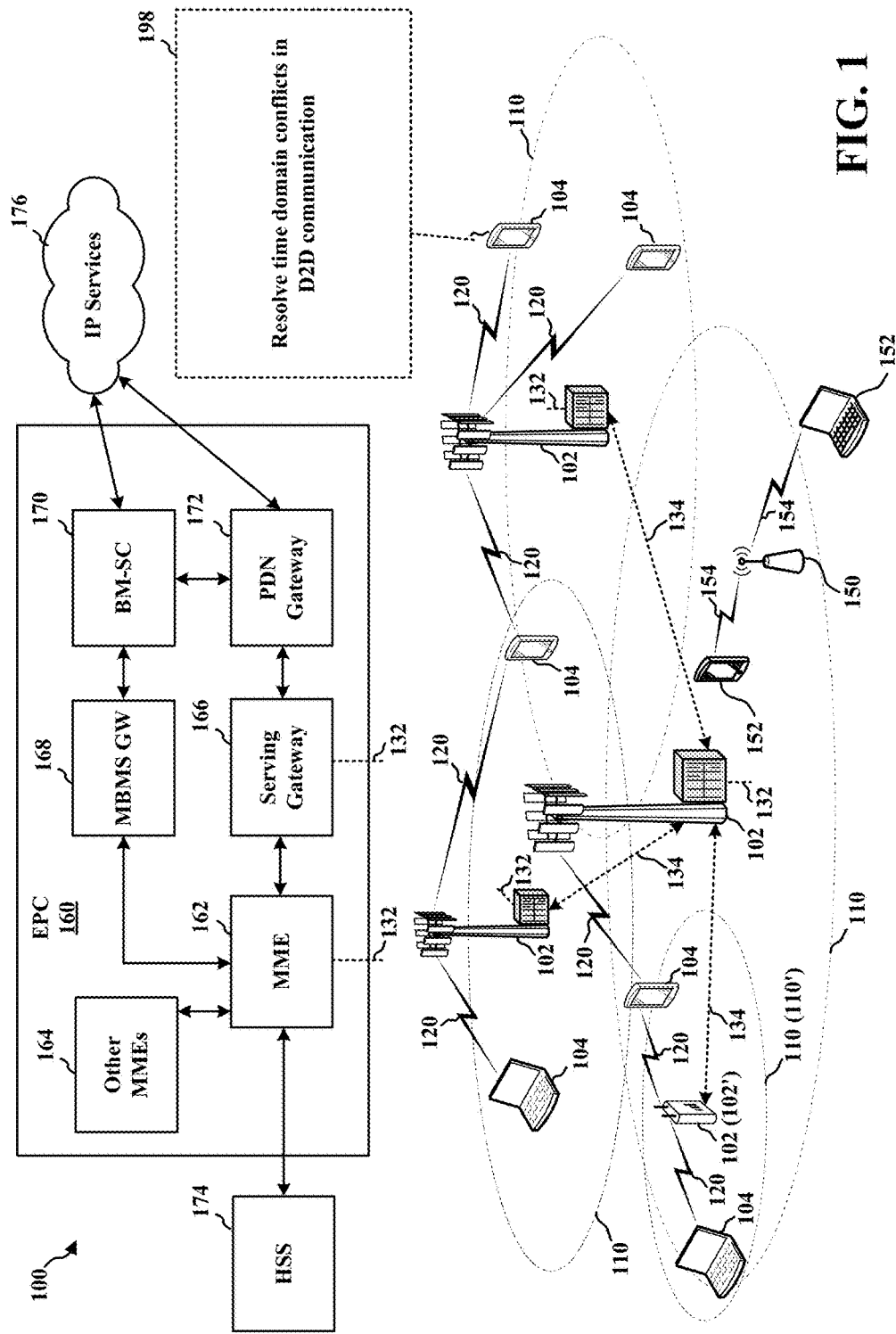
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to resolve (198) time domain conflicts in D2D communication. Details of operations performed at 198 will be further described below with reference to FIGS. 5-16.

Figures 2A, 2B, 2C, 2D:
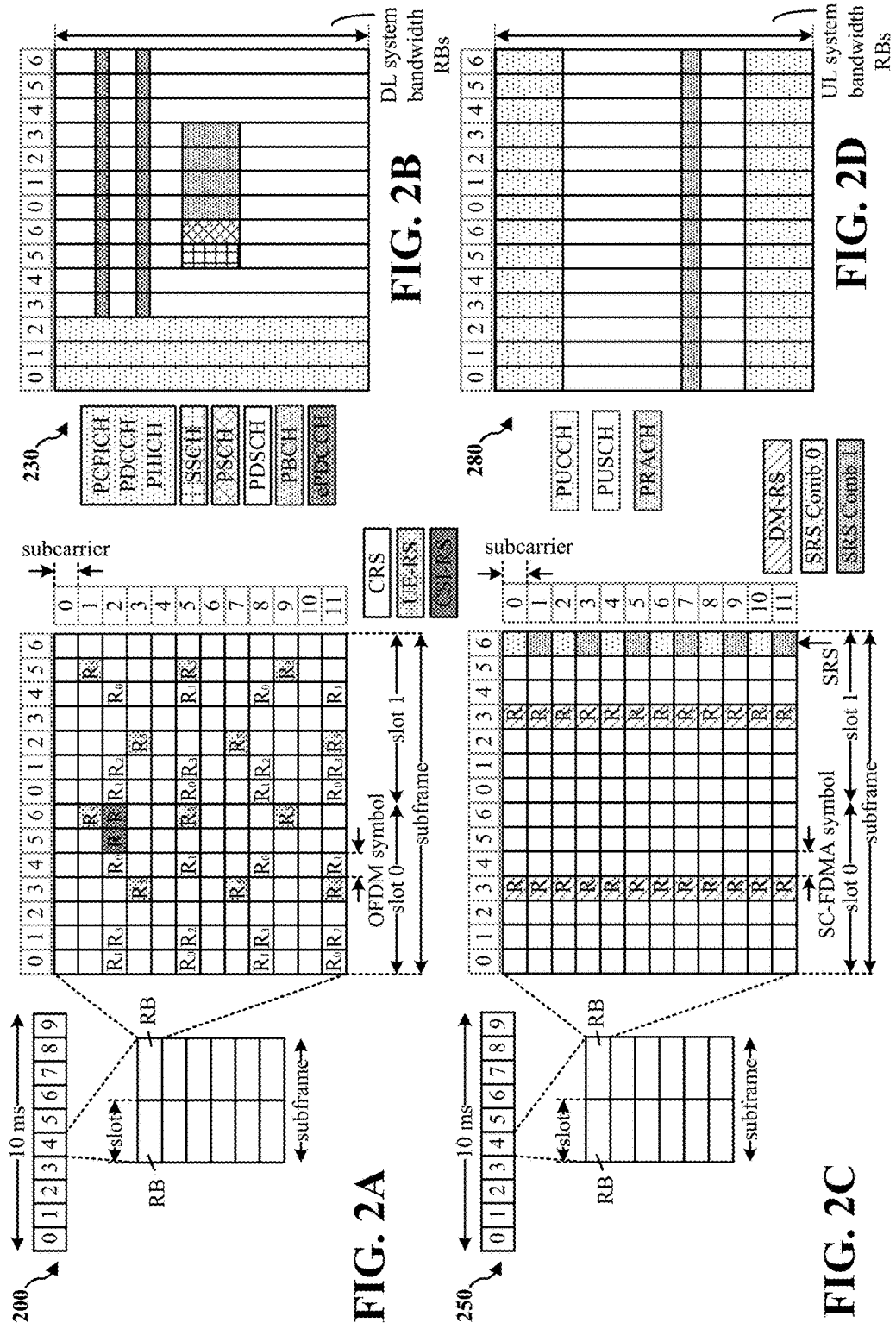
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
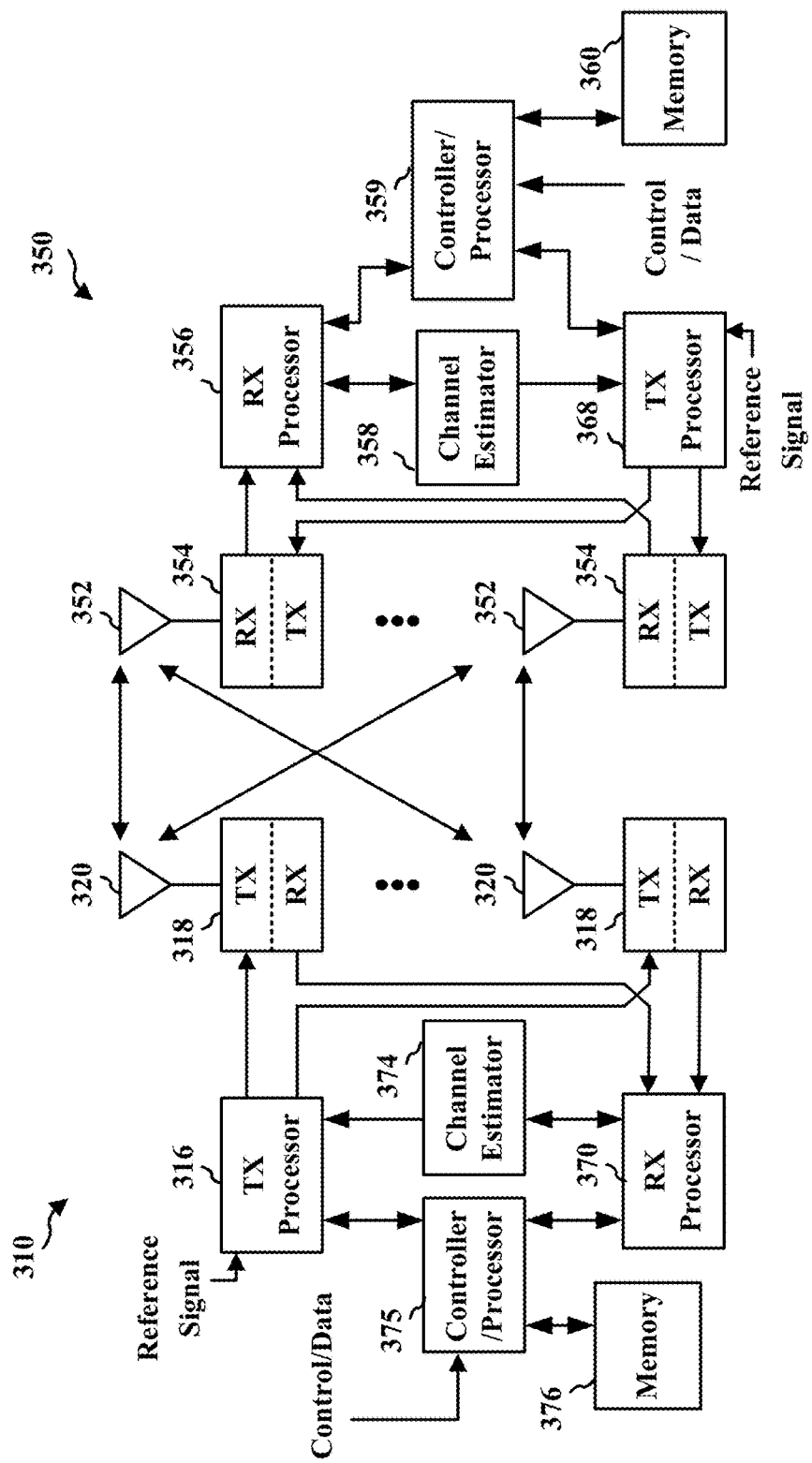
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
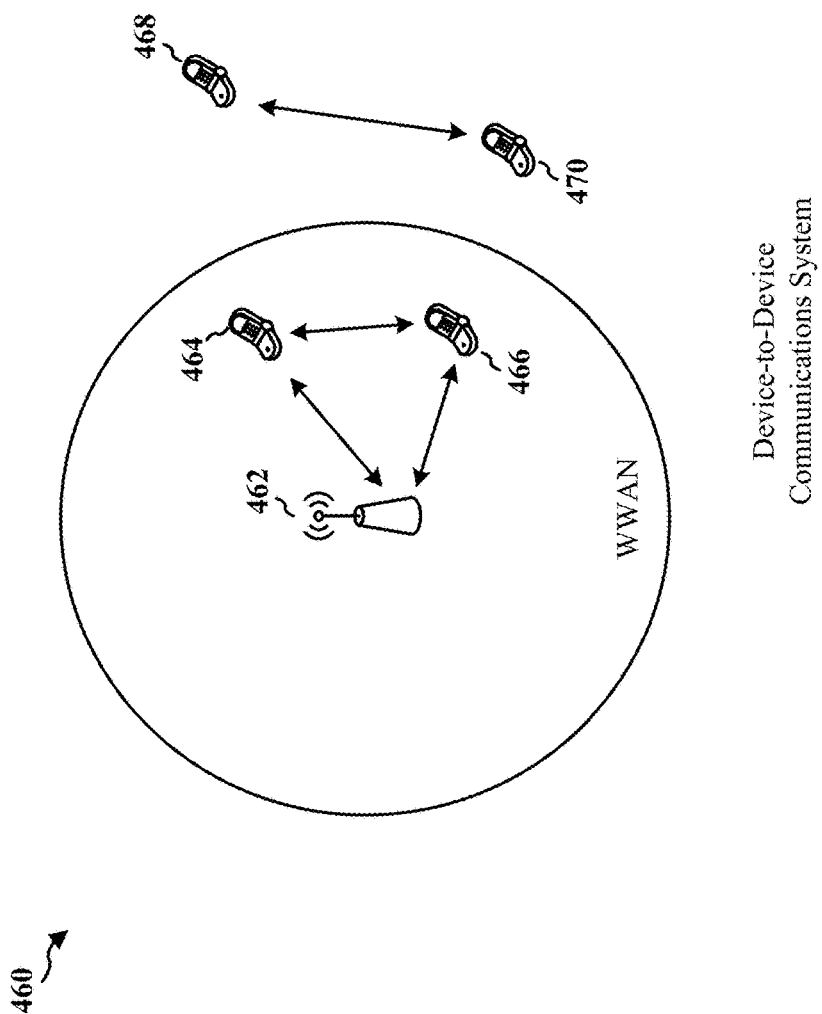
FIG. 4 is a diagram of a device-to-device communications system.

FIG. 4 is a diagram of a device-to-device (D2D) communications system 460. The D2D communications system 460 includes a plurality of UEs 464, 466, 468, 470. The D2D communications system 460 may overlap with a cellular communications system, such as for example, a WWAN. Some of the UEs 464, 466, 468, 470 may communicate together in D2D communication using the DL/UL WWAN spectrum, some may communicate with the base station 462, and some may do both. For example, as shown in FIG. 4, the UEs 468, 470 are in D2D communication and the UEs 464, 466 are in D2D communication. The UEs 464, 466 are also communicating with the base station 462. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Figure 5:
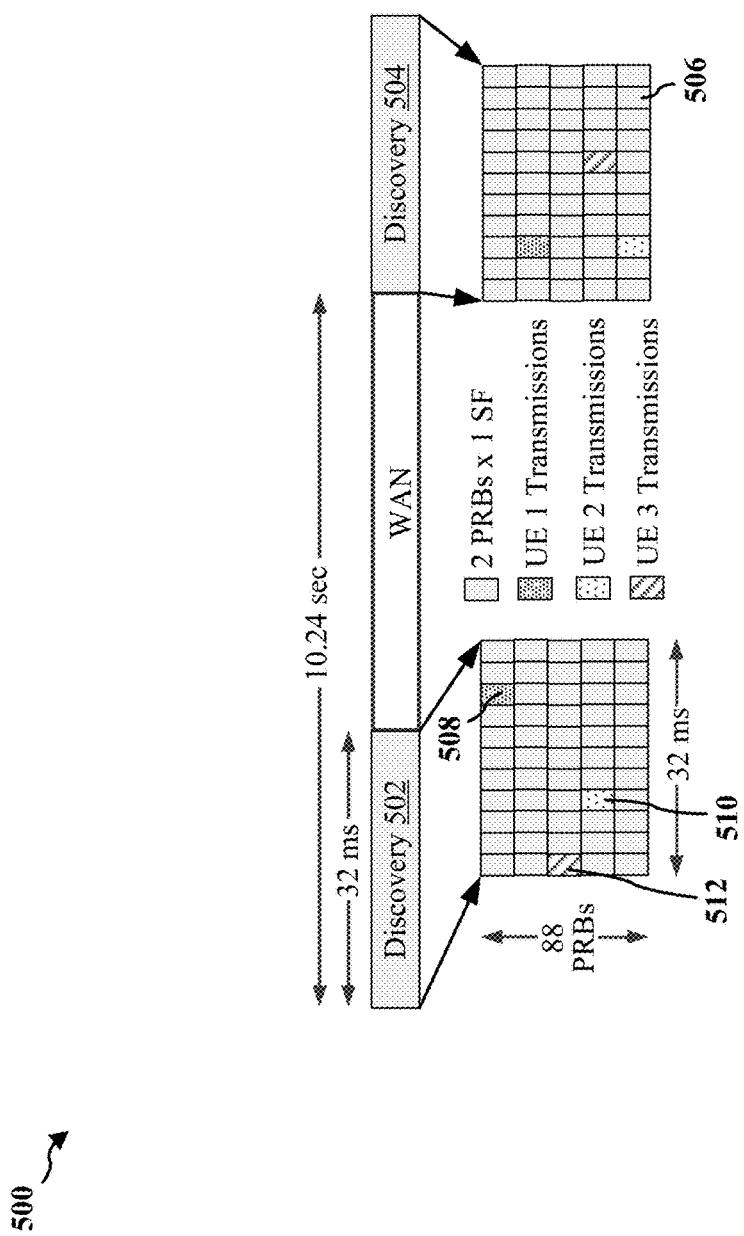
FIG. 5 is a diagram illustrating an example of resource allocation for device-to-device communication.

FIG. 5 is a diagram 500 illustrating an example of resource allocation for device-to-device communication. In this example, D2D communication may be performed during discovery segments (e.g., discovery segments 502, 504). A discovery segment may be a set of subframes set aside for D2D communication/discovery. Each subframe may include multiple PRBs (e.g., 88 PRBs). In one configuration, D2D discovery may use a small fraction of UL resources. For example, there may be one discovery segment (e.g., discovery segment 502) of 32 ms (or 32 subframes) every 10.24 seconds. The rest of the 10.24 seconds may be reserved for WAN communication. Therefore, the overhead for D2D discovery is approximately 0.32%.

In one configuration, a discovery resource (e.g., discovery resource 506) is two PRBs within a subframe. In this example, because there are 32 subframes in each discovery segment and 88 PRBs in each subframe, there are 1408 (32×88÷2) discovery resources in each discovery segment. The communication resources are time-synced within a geographical area. In one configuration, D2D communication in time-division duplexing (TDD) may be allowed in UL subframes. In one configuration D2D communication in frequency-division duplexing (FDD) may be allowed in UL frequencies.

UEs may transmit and receive expression codes (e.g., network-layer discovery identifiers) within the discovery resources. For example, UE 1 may transmit and receive expression codes using discovery resource 508, UE 2 may transmit and receive expressions using discovery resource 510, and UE 3 may transmit and receive expression codes using discovery resource 512.

Figure 6:
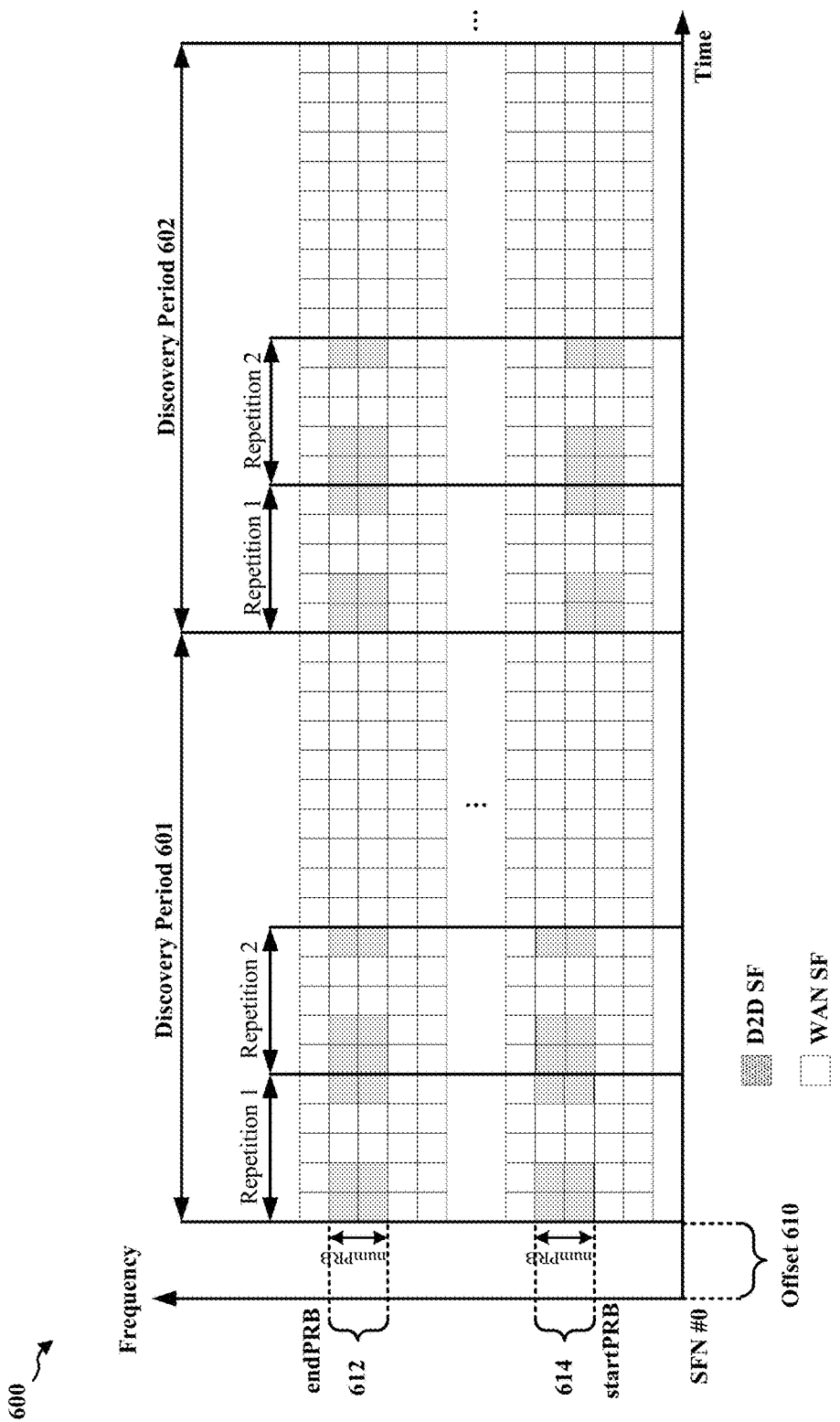
FIG. 6 is a diagram illustrating an example of a device-to-device communication resource timeline.

FIG. 6 is a diagram 600 illustrating an example of a device-to-device communication resource timeline. In this example, there is an offset 610 between the start of subframe #0 and the start of discovery period 601, which is immediately followed by a discovery period 602. A resource pool is a set of resources assigned to the D2D operation. The resource pool may include the subframes and the resource blocks within the pool. Subframes allocated to the resource pool are indicated in FIG. 6 as shaded areas. Within a subframe allocated to the resource pool, the resources used for D2D communication may be in two bands 612 and 614, which are identified by the occupied PRBs. The band 614 starts at startPRB and the band 612 ends at endPRB. Each band may have a width of numPRB resource blocks, which is the number of PRBs for D2D communication. In one configuration, numPRB is set to even value, e.g., 2.

In one configuration, D2D communication uses UL subframes/bands, and not DL subframes/bands. In one configuration, no more than one expression code may be transmitted by a UE in a subframe. In one configuration, numPRB, startPRB, endPRB may be signaled in a SIB (e.g., SIB 19), or may be signaled using dedicated signaling. In one configuration, there may be up to 16 RX pools and 4 TX pools per discovery period per frequency. In one configuration, there may be up to 8 frequencies for resource pools. In one configuration, the maximum number of retransmissions configured per pool may be three. In one configuration, retransmissions may be in successive D2D subframes.

WWAN operations may collide with D2D operations on a camped frequency or a non-camped frequency. In one configuration, a camped frequency may be the frequency used by the serving cell, and a non-camped frequency may be a frequency different from the frequency used by the serving cell. In general, when a D2D operation collides with a WWAN operation, the D2D operation is suspended to allow the WWAN operation to proceed. The D2D operation may be resumed after the WWAN operation is completed. In case of intra-frequency conflicts, D2D operations in UL subframes can occur while a UE is in sleep (e.g., idle, connected mode discontinuous reception off duration).

In one configuration, the primary component carrier (PCC) may be on frequency 1 (F1), the secondary component carrier (SCC) may be on frequency 2 (F2), and frequency 3 (F3) may be a neighbor frequency that is neither PCC nor SCC. The WWAN operations on F1 or F2 or F3 may be: a search operation, an MIB operation, a SIB decode operation, an idle measurement (intra-frequency, inter-frequency), PDSCH DL data, PDCCH (idle discontinuous reception, connected mode discontinuous reception on), eMBMS, acquisition (radio link failure, cell selection), connected mode measurements, DL CA scenarios, etc. The D2D operations on F1 or F2 or F3 may be a search operation, an MIB decode operation, a SIB 1 decode operation, a SIB 2 decode operation, a SIB 19 decode operation, RSRP measurement, D2D TX, D2D RX, etc.

D2D RX and TX operations are scheduled based on RX and TX pools which may have a conflict in time. D2D operations on one frequency may conflict with D2D operations on another frequency. When in conflict, D2D operations on one frequency may get most of the opportunities to proceed, while D2D operations on another frequency may not have an opportunity to proceed. In one configuration, an enhanced approach is provided so that each frequency gets a fair allocation to D2D operations.

A UE capable of D2D operations may also perform WWAN operations, which may have a time domain conflict with D2D operations. D2D operations on one frequency may conflict with WWAN operations on the same frequency or another frequency. WWAN operations may have a higher priority over D2D operations. As a result, a D2D operation may not get an opportunity to proceed for a long time (e.g., 100 seconds). Sometimes, a D2D operation may never get an opportunity to proceed because of conflicting WWAN operations. In one configuration, an approach is provided to invert priority in certain selected scenarios such that a starving D2D operation can be prioritized, while WWAN tasks are not impacted.

In one configuration, F1 may be the camped frequency (serving cell frequency), while F2 or F3 may be a neighbor frequency. In one configuration, an intra D2D time domain conflict may be resolved using a time domain conflict resolution (TDCR) method. An example of an intra D2D time domain conflict may be a TX pool on F1 and a RX pool on F1 at the same time. Another example of intra D2D time domain conflict may be a TX pool on F1 and a RX pool on F2 at the same time.

Figure 7:
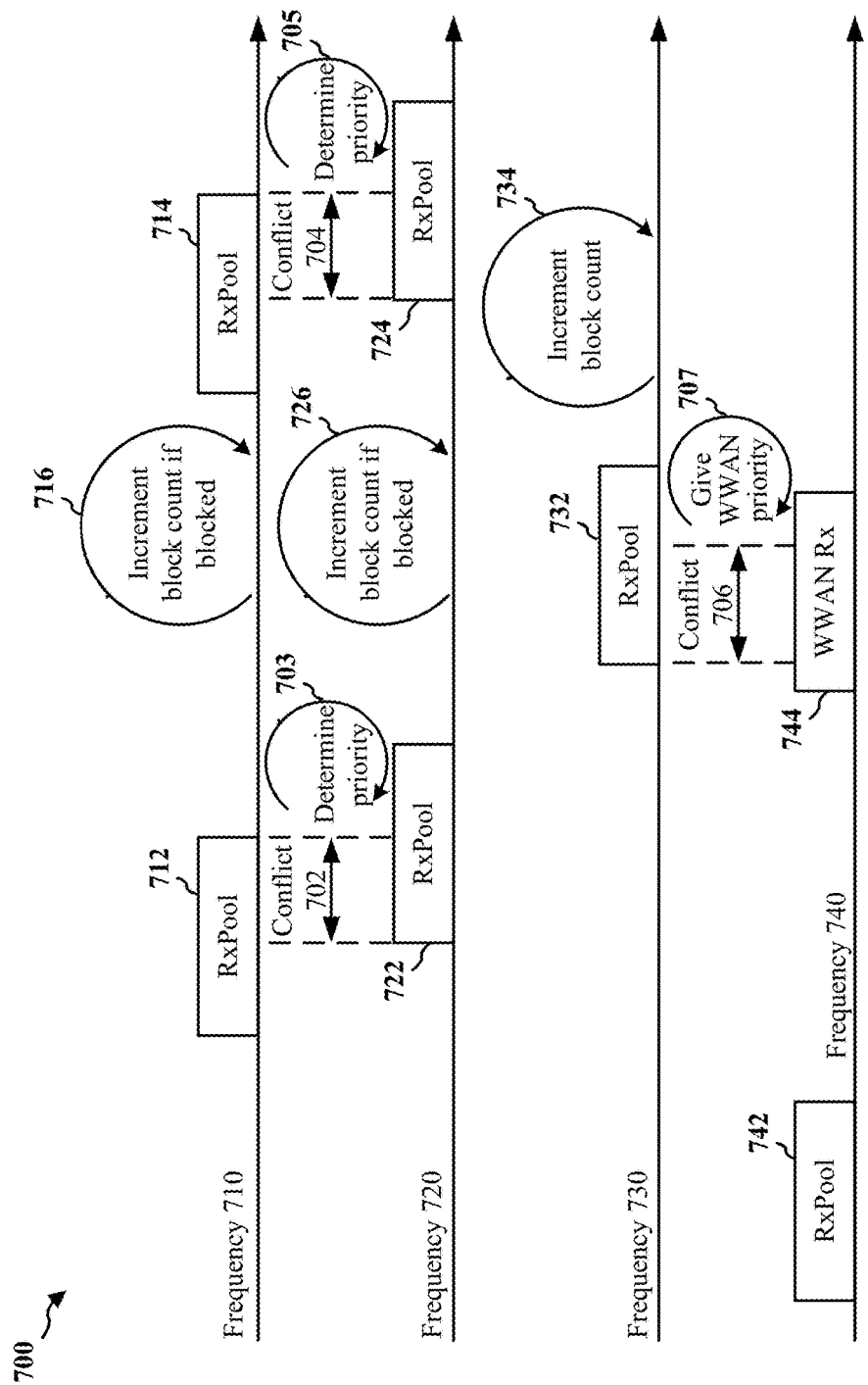
FIG. 7 is a diagram illustrating an example of using the time domain conflict resolution method to resolve time domain conflict for device-to-device communication.

FIG. 7 is a diagram 700 illustrating an example of using the time domain conflict resolution method to resolve time domain conflicts for device-to-device communication. In this example, a UE may perform D2D operations on four frequencies 710, 720, 730, and 740. There are two RX pools 712 and 714 on frequency 710. There are two RX pools 722 and 724 on frequency 720. There is one RX pool 732 on frequency 730. There are an RX pool 742 and a WWAN RX resource segment 744 on frequency 740.

There is a time domain conflict 702 between the RX pool 712 on frequency 710 and the RX pool 722 on frequency 720 as the RX pools 712 and 722 overlap in time. The UE may determine (at 703) the priority between the RX pools 712 and 722 based on a normalized block rate for frequency 710 and a normalized block rate for frequency 720. The normalized block rate for a frequency will be further described below. In one configuration, if the normalized block rate of frequency 710 is greater than the normalized block rate of frequency 720, the RX pool 712 is prioritized over the RX pool 722, and the UE increments (at 726) the block rate of frequency 720. If the normalized block rate of frequency 710 is less than the normalized block rate of frequency 720, the RX pool 722 is prioritized over the RX pool 712, and the UE increments (at 716) the block count of frequency 710. If the normalized block rate of frequency 710 is equal to the normalized block rate of frequency 720, one of the RX pools 712 and 722 is prioritized over another through random selection, and the UE increments (at 716 or 726) the block count of the frequency that is blocked from D2D communication.

There is also a time domain conflict 704 between the RX pool 714 on frequency 710 and the RX pool 724 on frequency 720. The UE may determine (at 705) the priority between the RX pools 714 and 724 based on the normalized block rate for frequency 710 and the normalized block rate for frequency 720 in the same way as described above regarding the time domain conflict 702.

There is a time domain conflict 706 between the RX pool 732 on frequency 730 and the WWAN RX resource segment 744 on frequency 740. The UE gives (at 707) the WWAN RX resource segment 744 priority over the RX pool 732. The UE also increments (at 732) the block count of frequency 730 as the RX pool 732 is blocked from performing D2D operations.

The normalized block rate is a metric that may help in making an informed and fair decision regarding a time domain conflict between two D2D operations or pools. In one configuration, the normalized block rate (NBR) for each RX frequency $F_k$ at discovery epoch/period T can be defined as, $$NBR_{Rx[F_k,T]} = \alpha * NBR_{Rx(F_k,T-1)} + (1-\alpha) * \frac{\text{Block\_Count\_Rx}[F_k, T]}{(\text{numretx}(F_k)+1) * \text{DiscoveryOpportunities\_Rx}[F_x]}$$

where
$NBR_{Rx(fk)}$ represents the infinite impulse response (IIR) filtered value of the percentage outage of RX codes (e.g., the number of RBs for D2D discovery within a subframe multiplied by the number of subframes) that could not be transmitted due to time domain conflicts, $NBR_{Rx(Fk)}$ may account for partial outages in subframes in RX pools,
Block_Count_Rx[$F_k$] represents the IIR filtered value of discovery resources (e.g., the number of RBs for D2D discovery within a subframe multiplied by the number of subframes) that were lost for D2D RX pool subframes for eligible monitoring SFs in the discovery epoch T,
DiscoveryOpportunities_Rx[$F_k$] represents the number of D2D RX pool monitoring attempts in in the discovery epoch T, note that RX pool time domain conflict arises if the RX pool is eligible for decode at a specific time (e.g., T_rxpool not running during the D2D subframes on frequency $F_k$ etc.),
α is the IIR filter coefficient (e.g., 0.75),
numretx($F_k$) represents the maximum number of HARQ transmissions.

In one configuration, the NBR for D2D TX frequency $F_m$ at discovery epoch/period T can be defined as, $$NBR_{Tx[F_m,T]} = \alpha * NBR_{Tx(F_m,T-1)} + (1-\alpha) * \frac{\text{Block\_Count\_Tx}[F_m, T]}{\text{DiscoverySFs\_Tx}[F_m]}$$

where
$NBR_{Tx(Fm)}$ represents the IIR filtered value of the percentage outage of TX codes (e.g., the number of RBs for D2D discovery within a subframe multiplied by the number of subframes) that could not be transmitted due to time domain conflicts, the IIR filtering is done for opportunities in which a particular frequency is eligible for D2D TX/RX (and not for every opportunity),
Block_Count_Tx[$F_m$] represents the number of discovery resources (e.g., the number of RBs for D2D discovery within a subframe multiplied by the number of subframes) that were lost for D2D TX pool of the total number of selected TX subframes for transmission in the discovery epoch T, RBs lost can be determined for each RX pool that is considered based on startPRB/endPRB in SIB19,
DiscoverySFs_Tx[$F_m$] represents the number of selected subframes for TX for transmission of codes in the eligible TX pool opportunities in the last discovery epoch T,
α is the IIR filter coefficient (e.g., 0.75).

Figure 8:
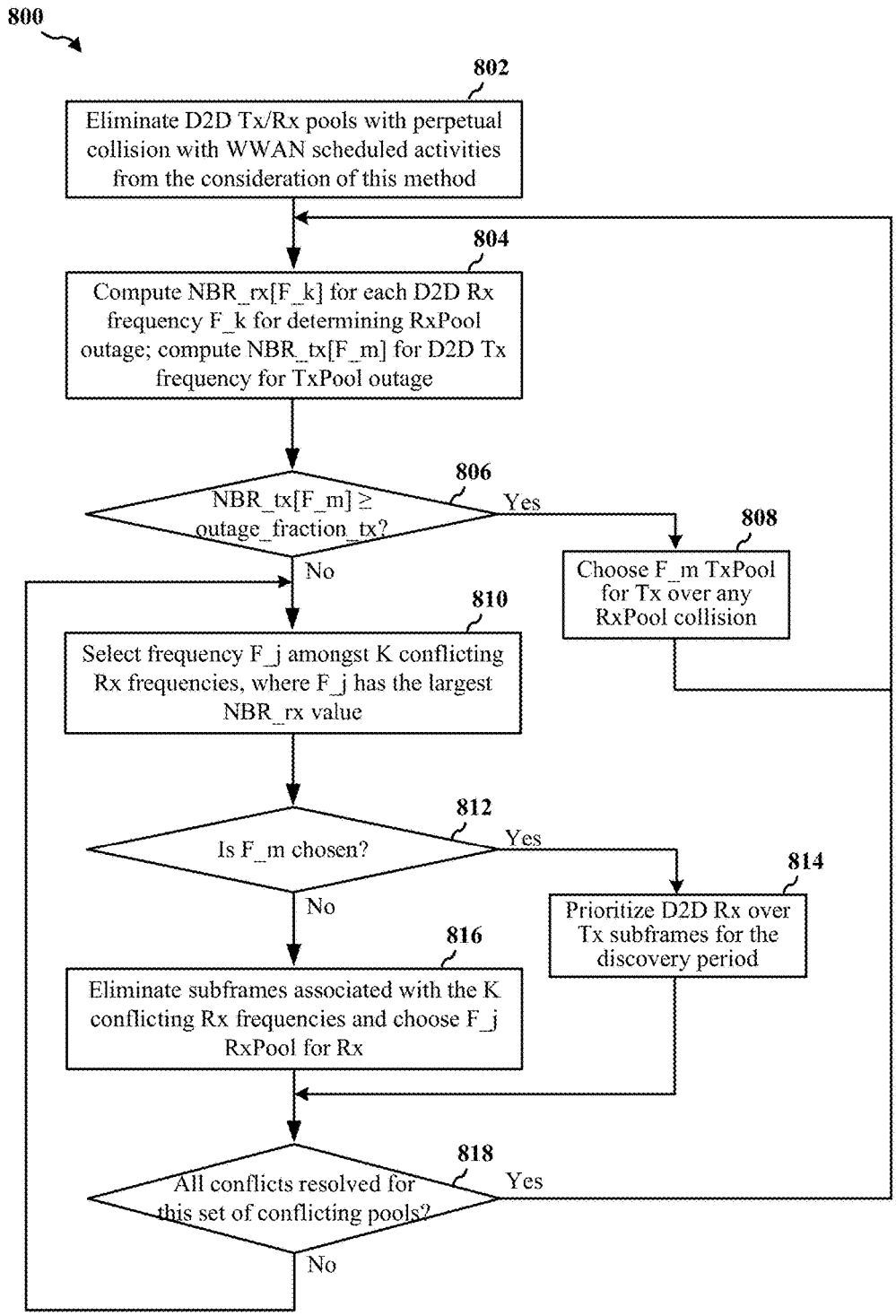
FIG. 8 is a flowchart of a method of a time domain conflict resolution.

FIG. 8 is a flowchart 800 of a method of a time domain conflict resolution. The method may be performed by a UE (e.g., the UE 104, 350, 464, 466, 468, 470, or the apparatus 1502/1502'). At 802, the UE eliminates D2D TX/RX pools with perpetual collision with WWAN scheduled activities from consideration in this method. For example, if a pool (RX or TX) of a frequency collides with WWAN subframes (scheduled cases such as page monitoring or connected mode discontinuous reception on) in a manner that allows for less than a threshold number of subframes (for TX/RX), eliminate the pool from consideration. In one configuration, $NBR_{Rx(Fk)}$ for the pool may not be incremented due to WWAN collision. In one configuration, use of a separate RX chain may allow D2D RX during WWAN, thus overcoming the collision problem.

At 804, the UE computes $NBR_{Rx(Fk)}$ for each D2D RX frequency $F_k$ for determining RX pool outage for each RX frequency $F_k$; the UE also computes $NBR_{Tx(Fm)}$ for D2D TX frequency $F_m$ for TX pool outage. In one configuration, D2D TX on $F_m$ collides with D2D RX on $F_m$. In one configuration, D2D TX on $F_m$ may also collide with D2D RX on $F_k$, where k≠m. In one configuration, a set of conflicting pools is identified at 804.

At 806, the UE determines whether $NBR_{Tx(Fm)}$ is greater than or equal to a threshold (e.g., outage_fraction_tx). If $NBR_{Tx(Fm)}$ is greater than or equal to outage_fraction_tx, the UE proceeds to 808. If $NBR_{Tx(Fm)}$ is less than outage_fraction_tx, the UE proceeds to 810. In one configuration, outage_fraction_tx is a predefined parameter. In one configuration, $NBR_{Tx}$ being greater than or equal to outage_fraction_tx indicates that TX has been starved for a significant percentage of time. In one configuration, outage_fraction_tx is fraction of outage of TX subframes above which a D2D TX operation has priority over a D2D RX operation. If outage_fraction_tx is set to 0, D2D TX is always higher priority than D2D RX (across all frequencies). If outage_fraction_tx is set to 1, D2D RX is always higher priority than D2D RX (across all frequencies).

At 808, the UE chooses $F_m$ TX pool for TX over any RX pool collision. In one configuration, the UE prioritizes D2D TX in TX subframes for that discovery period (remaining subframes in that discovery period can be used by RX). The UE then loops back to 804.

At 810, the UE selects frequency $F_j$ among K conflicting RX frequencies, where $F_j$ has the largest $NBR_{Rx}$ value.

At 812, the UE determines whether the chosen frequency is frequency $F_m$. If the chosen frequency is frequency $F_m$, the UE proceeds to 814. If the chosen frequency is not frequency $F_m$, the UE proceeds to 816.

At 814, the UE prioritizes D2D RX over TX subframes for the discovery period. In one configuration, remaining subframes in that discovery period can be used by RX. The UE then proceeds to 818.

At 816, the UE eliminates subframes associated with the K conflicting RX frequencies and chooses $F_j$ RX pool for RX operation. The UE then proceeds to 818.

At 818, the UE determines whether all conflicts have been resolved for this set of conflicting pools. If all conflicts have been resolved for the set of conflicting pools identified at 804, the UE loops back to 804. If not all conflicts have been resolved for the set of conflicting pools identified at 804, the UE loops back to 810.

In one configuration, partial decode of subframes in a pool is supported. Updates to the $NBR_{Tx}$ and $NBR_{Rx}$ metrics are performed during the operations in FIG. 8 and will be further described below with respect to FIG. 9. In one configuration, to minimize overhead of RF tuning/warmup on a target frequency, a check is performed to determine if there are at least a threshold number of subframes for D2D TX/RX before tuning to that frequency. This threshold number of subframes may be different for TX and RX.

Figure 9:
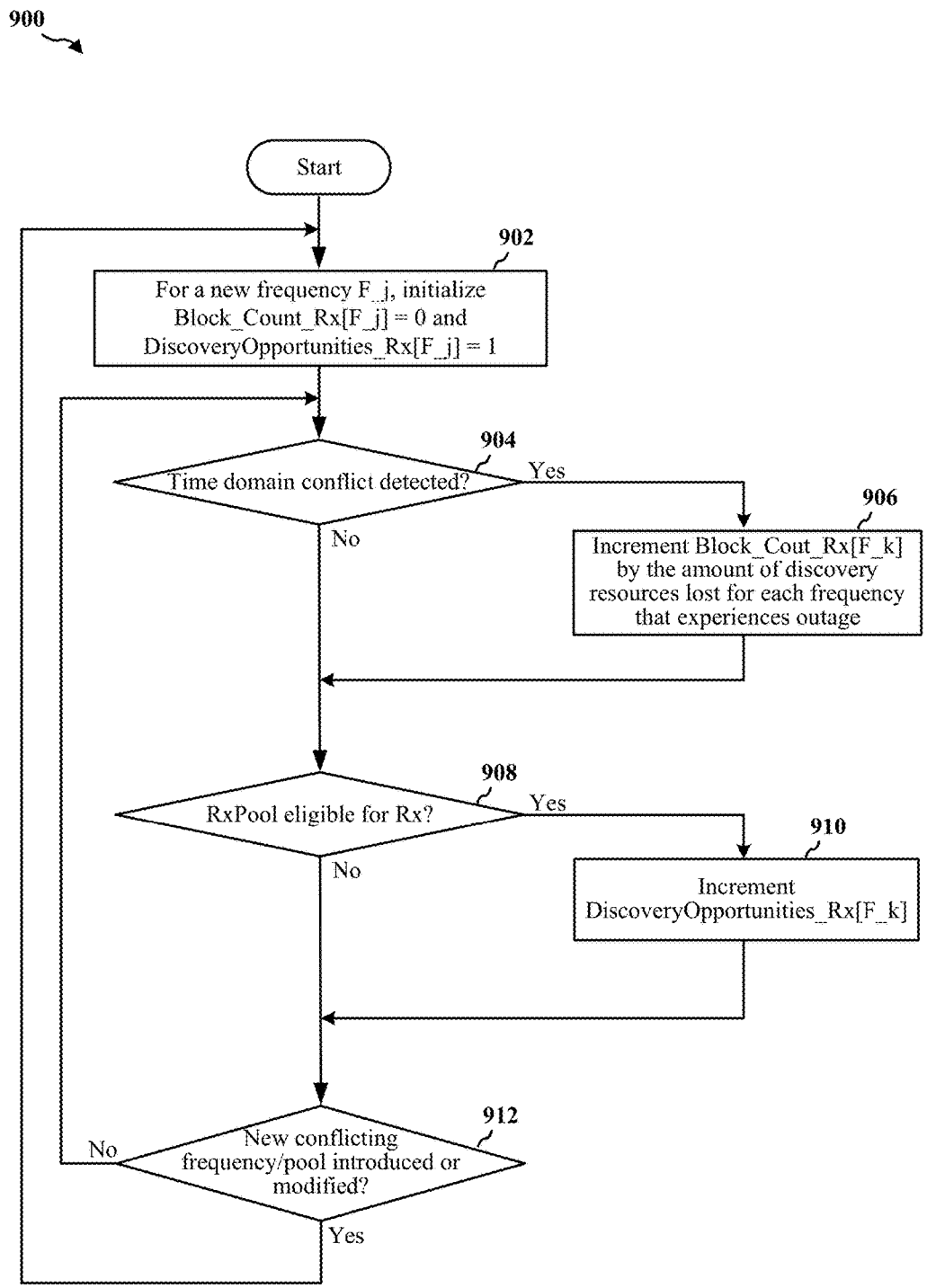
FIG. 9 is a flowchart of a method of updating normalized block rate metrics for time domain conflict resolution.

FIG. 9 is a flowchart 900 of a method of updating normalized block rate metrics for time domain conflict resolution. Specifically, the flowchart 900 describes a method of updating $NBR_{Rx}$. The method may be performed by a UE (e.g., the UE 104, 350, 464, 466, 468, 470, or the apparatus 1502/1502'). At 902, the UE initializes, for a new frequency $F_j$, Block_Count_Rx[$F_j$] to be zero and DiscoveryOpportunities_Rx[$F_j$] to be one.

At 904, the UE determines whether a time domain conflict for a RX pool on $F_j$ is detected. If a time domain conflict is detected, the UE proceeds to 906. If a time domain conflict is not detected, the UE proceeds to 908.

At 906, the UE increments Block_Count_Rx[$F_k$] by the amount of discovery resources lost (e.g., the number of RBs for D2D RX within a subframe multiplied by the number of subframes that suffer outage) for each frequency that experiences outage. In one configuration, the number of subframes that suffer outage may be less than the size of the RX pool (e.g., partial/fractional outage). The UE then proceeds to 908.

At 908, the UE determines whether the RX pool is eligible for RX operation. For example, the UE may determine whether the RX pool is eligible for decode (i.e., no backoff timer is ongoing etc.). If the RX pool is eligible for RX, the UE proceeds to 910. If the RX pool is not eligible for RX, the UE proceeds to 912.

At 910, the UE increments DiscoveryOpportunities_Rx[$F_k$]. The UE then proceeds to 912. In one configuration, Block_Count_Rx[$F_k$] and DiscoveryOpportunities_Rx[$F_k$] may be incremented continually during RRC_CONNECTED states or due to tune-aways. In one configuration, during long tune-aways, the $NBR_{Rx}$ and $NBR_{Tx}$ is initialized to the total number of RB*SF*RxPool size, which is the number is RBs for D2D RX within a subframe multiplied by the number of subframes within a RX pool multiplied by the number of RX pools.

At 912, the UE determines whether a new conflicting frequency or pool is introduced, or an existing RX pool schedule for an existing frequency is modified. If a new conflicting frequency or pool is introduced or an existing RX pool schedule for an existing frequency is modified, the UE loops back to 902 to reset Block_Count_Rx and DiscoveryOpportunities_Rx to zero and one, respectively, for all conflicting frequencies. If a new conflicting frequency or pool is not introduced or no existing RX pool schedule for an existing frequency is modified, the UE loops back to 904.

In one configuration, a similar procedure applies for RX frequencies for computing $NBR_{Tx}$. In one configuration, Block_Count_Tx[$F_m$] accounts for outage of selected TX subframes (and not the entire TX pool of subframes).

In one configuration, Block_Count_Rx and DiscoveryOpportunities_Rx may be persisted/stored when LTE stack is not active (e.g., in case of fast pingpongs) to ensure fairness. In one configuration, Block_Count_Rx and DiscoveryOpportunities_Rx may be reset to 0 and 1, respectively, if these metrics for all the frequencies have not been updated for more than a pre-determined number of seconds.

Figure 10:
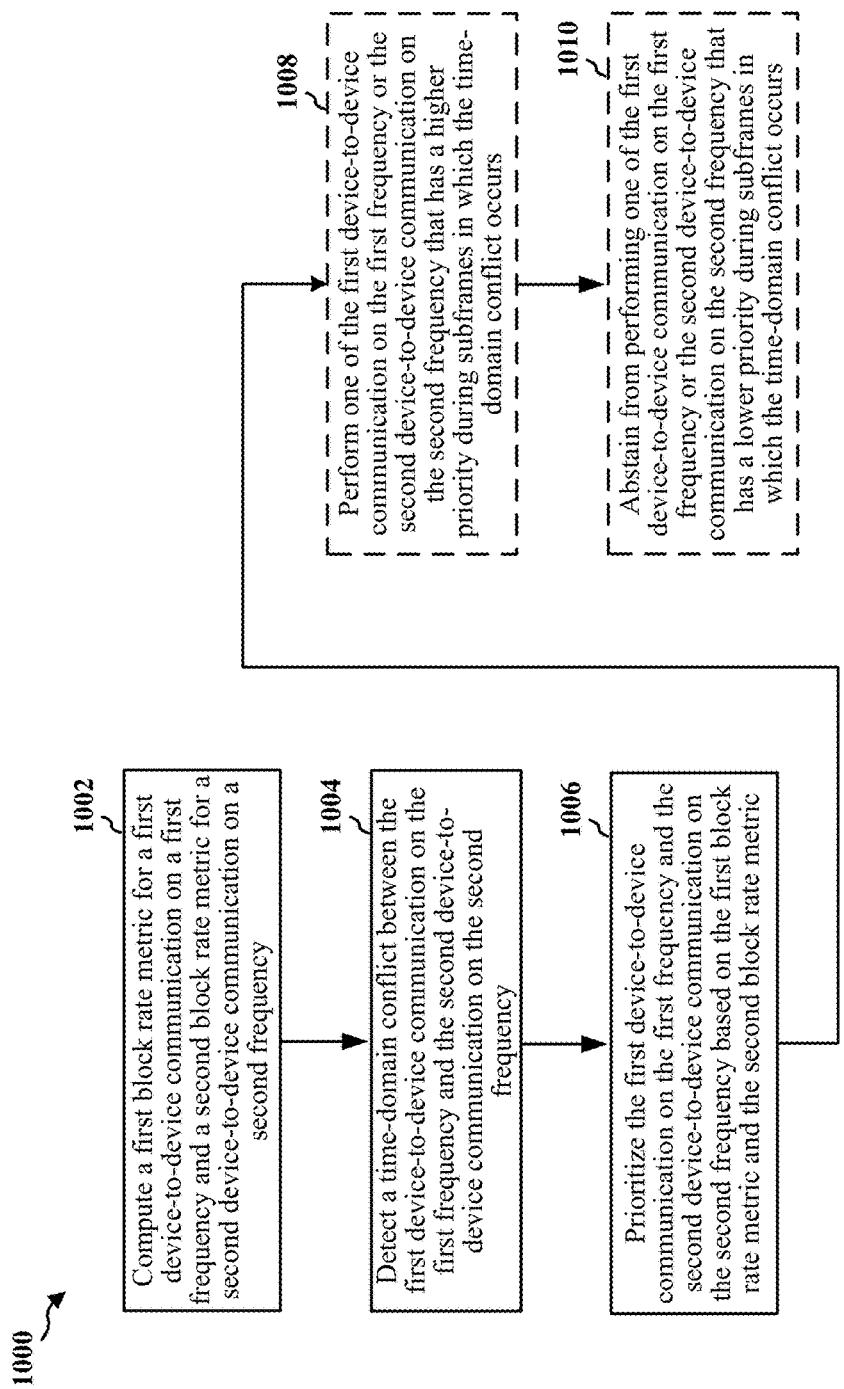
FIG. 10 is a flowchart of a method of a time domain conflict resolution.

FIG. 10 is a flowchart 1000 of a method of a time domain conflict resolution. The method may be performed by a UE (e.g., the UE 104, 350, 464, 466, 468, 470, or the apparatus 1502/1502'). In one configuration, the method described in FIG. 10 may be the methods described above with reference to FIGS. 8 and 9. At 1002, the UE computes a first block rate metric (e.g., NBR) for a first device-to-device communication on a first frequency and a second block rate metric (e.g., NBR) for a second device-to-device communication on a second frequency.

At 1004, the UE detects a time-domain conflict between the first device-to-device communication on the first frequency and the second device-to-device communication on the second frequency. In one configuration, the detected time-domain conflict is not a perpetual collision between WWAN operations and D2D operations.

At 1006, the UE prioritizes the first device-to-device communication on the first frequency and the second device-to-device communication on the second frequency based on the first block rate metric and the second block rate metric.

In one configuration, the first device-to-device communication may be a device-to-device transmit operation and the second device-to-device communication may be a device-to-device receive operation. In such a configuration, the device-to-device transmit operation on the first frequency may be prioritized over the device-to-device receive operation on the second frequency when the first block rate metric is greater than or equal to a threshold (e.g., outage_fraction_tx).

In one configuration, the first frequency and the second frequency are the same frequency. In such a configuration, the device-to-device transmit operation may be prioritized over the device-to-device receive operation in subframes for the device-to-device transmit operation during a discovery period in which the time-domain conflict occurs.

In one configuration, the device-to-device receive operation on the second frequency may be prioritized over the device-to-device transmit operation on the first frequency when the first block rate metric is less than the threshold. In one configuration, the first frequency and the second frequency are the same frequency. In such a configuration, the device-to-device receive operation may be prioritized over the device-to-device transmit operation in subframes for the device-to-device transmit operation during a discovery period in which the time-domain conflict occurs.

In one configuration, the first device-to-device communication may be a first device-to-device receive operation and the second device-to-device communication may be a second device-to-device receive operation. In one configuration, the first device-to-device receive operation on the first frequency may be prioritized over the second device-to-device receive operation on the second frequency when the first block rate metric is greater than the second block rate metric. In one configuration, one of the first device-to-device receive operation on the first frequency and the second device-to-device receive operation on the second frequency may be randomly selected to prioritize over another one of the first device-to-device receive operation on the first frequency and the second device-to-device receive operation on the second frequency when the first block rate metric is equal to the second block rate metric.

At 1008, the UE may optionally perform one of the first device-to-device communication on the first frequency or the second device-to-device communication on the second frequency that has a higher priority during subframes in which the time-domain conflict occurs.

At 1010, the UE may optionally abstain from performing one of the first device-to-device communication on the first frequency or the second device-to-device communication on the second frequency that has a lower priority during subframes in which the time-domain conflict occurs.

In one configuration, at least one of the first block rate metric or the second block rate metric is computed based on the number of resource blocks lost in eligible monitoring subframes for a device-to-device receive operation during a fixed period of time and the number of monitoring attempts for the device-to-device receive operation during the fixed period of time. In one configuration, one of the first block rate metric or the second block rate metric is computed based on the number of resource blocks lost in selected transmit subframes for a device-to-device transmit operation during a fixed period of time and the total number of the selected transmit subframes for the device-to-device transmit operation during the fixed period of time.

There are various WWAN interactions that can collide with D2D communication and cause D2D communication starvation. Under most cases, WWAN operations may be performed to maintain spec compliance and hence WWAN operations would be prioritized over D2D operations. However, there are certain configurations as described below, which may cause D2D and WAN operations to perpetually collide (e.g., overlapping in time domain), resulting in a complete outage for D2D processes.

Figure 11:
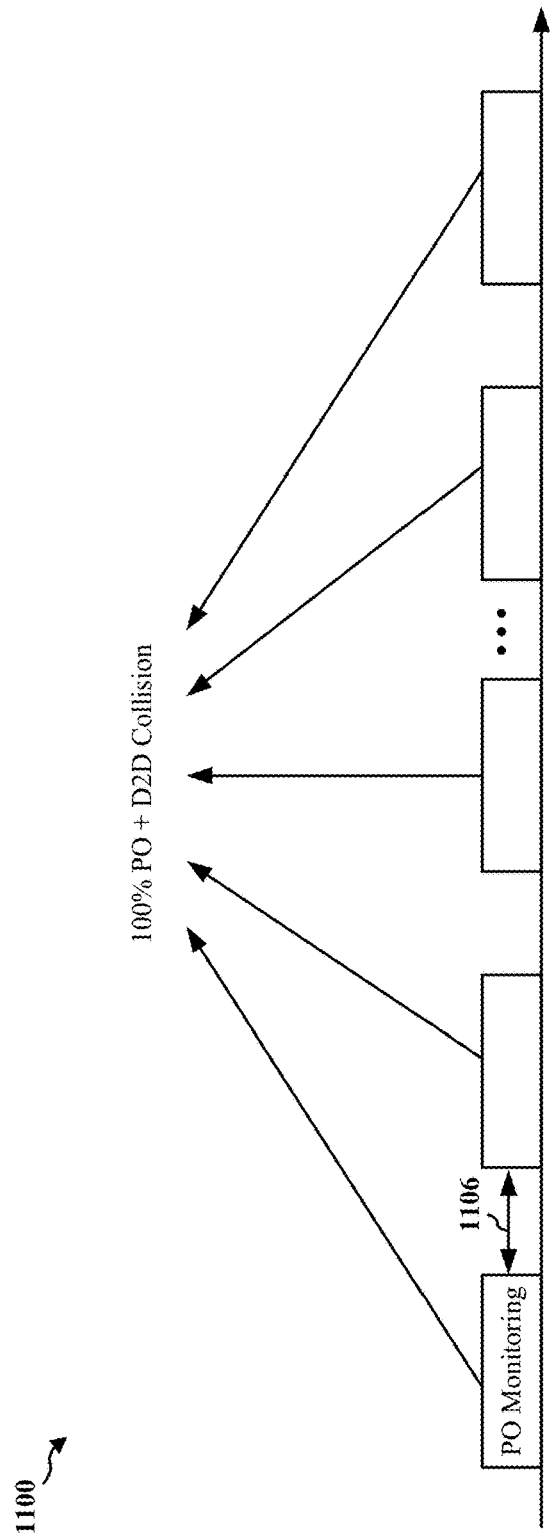
FIG. 11 is a diagram illustrating an example of paging occasions colliding with device-to-device receive or transmit.

FIG. 11 is a diagram 1100 illustrating an example of paging occasions colliding with device-to-device RX/TX. In one configuration, a paging occasion is a subframe where there may be paging radio network temporary identifier (P-RNTI) transmitted on PDCCH addressing the paging message. In this example, paging occasions occur periodically with a periodicity of 1106, which may happen to be the periodicity of the D2D communication. As a result, D2D operations may perpetually collide (e.g., colliding in every occasion) with the paging occasions. Note that the WWAN operations causing perpetual collision with D2D operations can be any WWAN process or operation, not necessarily a paging occasion.

Traditionally, a D2D discovery period is offset with regard to subframe 0 by a fixed amount. Since the offset is expected to remain static, the discovery period will always start at a fixed offset from subframe 0, resulting in the perpetual collision. For example, the offset $\Delta(n)$ may be calculated by, $$\Delta(n) = \text{SL-OffsetIndicator} \mod 250 \text{ msec}$$

where
SL-OffsetIndicator is a system parameter configured with a fixed value.

Figure 12:
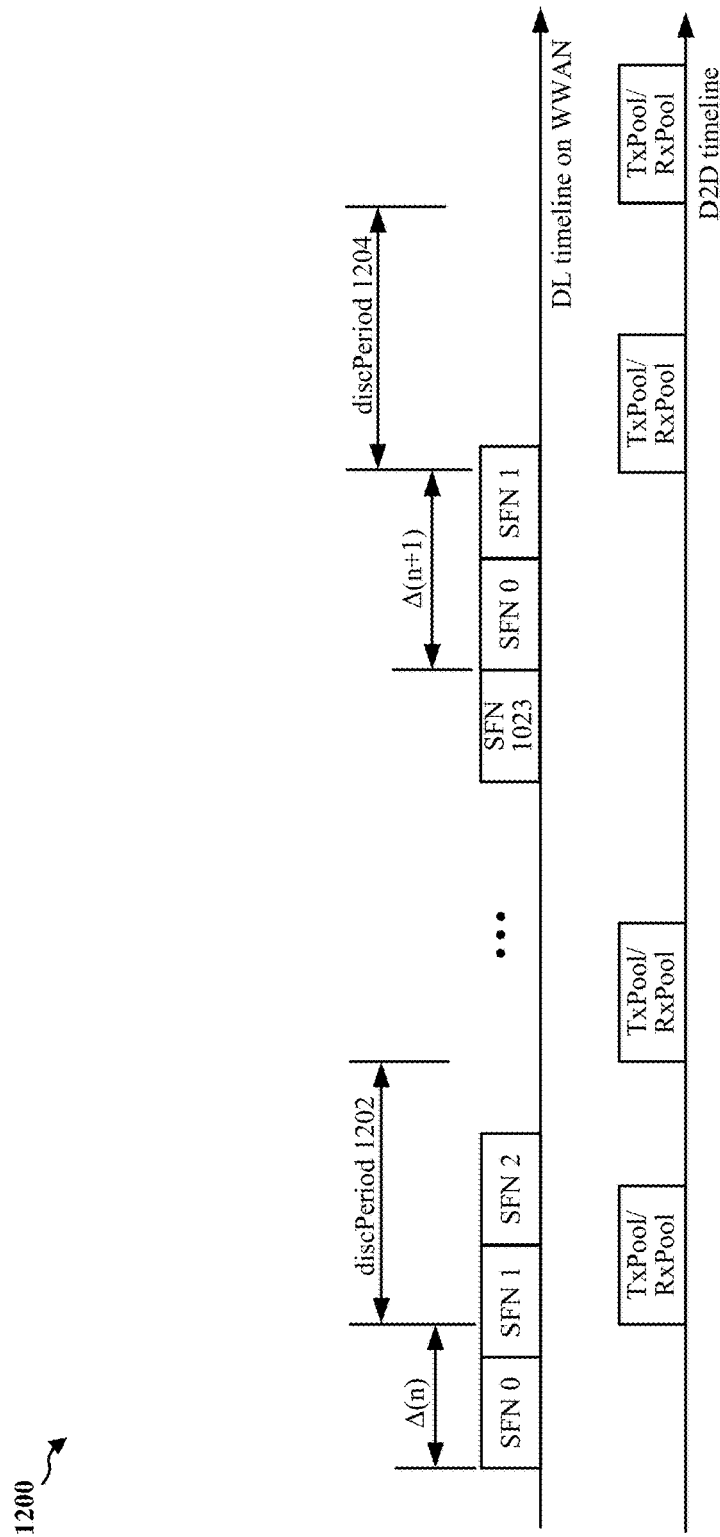
FIG. 12 is a diagram illustrating an example of a method avoiding perpetual collisions between WWAN and D2D operations.
Figure 13:
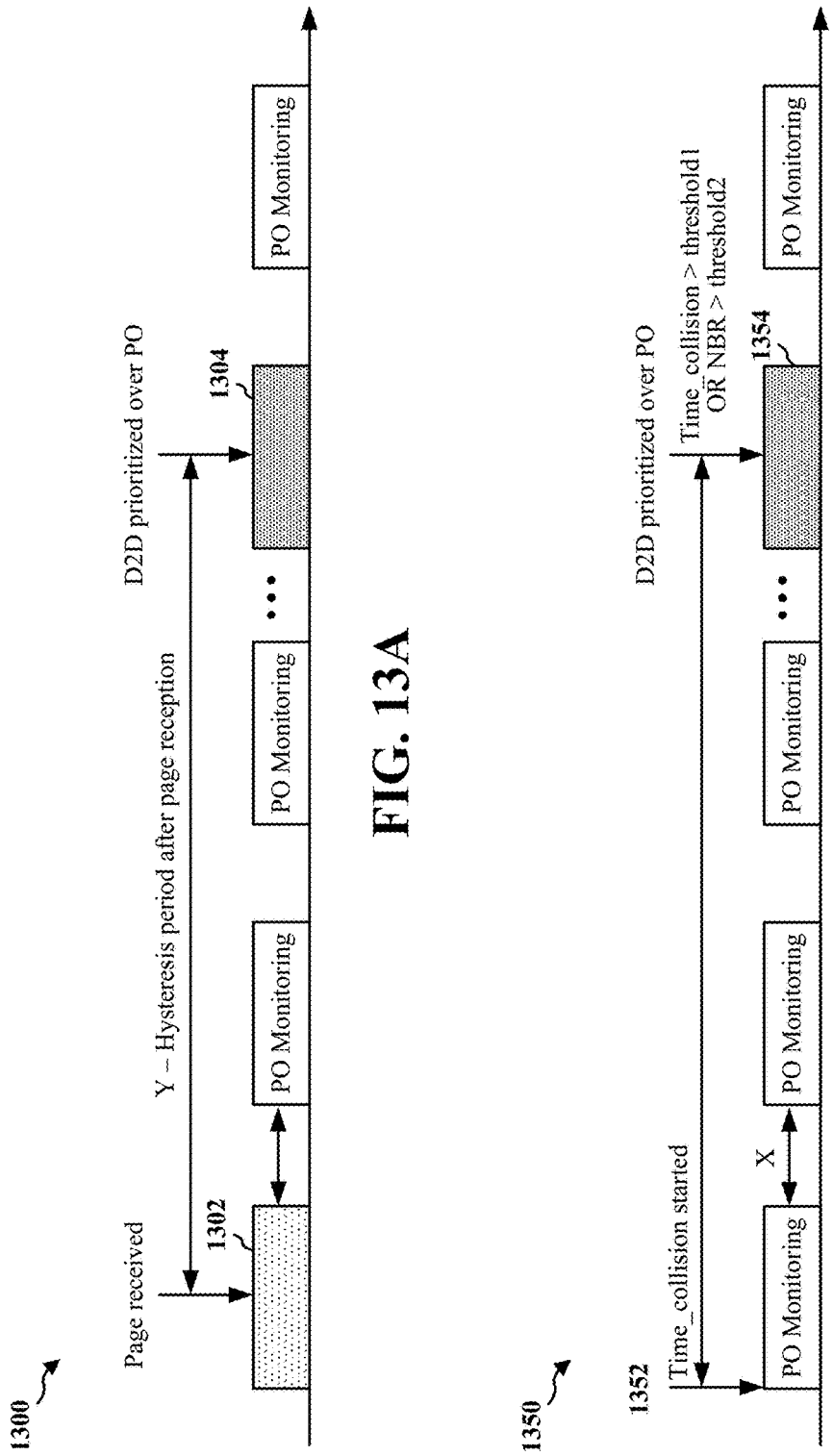
FIG. 13A is a diagram illustrating another example of a method of avoiding perpetual collisions between WWAN and D2D operations.
FIG. 13B is a diagram illustrating yet another example of a method of avoiding perpetual collisions between WWAN and D2D operations.

FIG. 12 is a diagram 1200 illustrating an example of a method avoiding perpetual collisions between WWAN and D2D operations. Specifically, this example determines the offset of discovery period based on a random number, thus producing offsets of variable length to avoid perpetual collision. For example, the equation for calculating offset $\Delta(n)$ may be modified as, $$\Delta(n) = (\text{UTCTimeCounter} \ast 40 + \text{SL-OffsetIndicator}) \mod 250 \text{ msec}$$

where
UTCTimeCounter is a system clock that increments by one every 10.24 msec.

By calculating the offset based on the random number UTCTimeCounter*40 (40 is arbitrary), the lengths of the offset become variable, thus reducing the chance of perpetual collision in every discovery period. As shown in FIG. 12, offsets $\Delta(n)$ and $\Delta(n+1)$ have different lengths. Thus, discovery period 1202 starts near the beginning of subframe 1, while discovery period 1204 starts near the end of subframe 1. By starting different discovery periods at different times relative to WWAN subframes, the chance of a perpetual collision in every discovery period is reduced.

FIG. 13A is a diagram 1300 illustrating another example of a method of avoiding perpetual collisions between WWAN and D2D operations. Specifically, this method provides a set of rules for priority inversion based on a page received in the recent past (e.g., in the recent Y paging occasions). In this example, a page is received at paging occasion 1302. In one configuration, if a page has been detected in the past, selectively blow (i.e., D2D prioritized over WWAN) one page occasion 1304 to account for D2D after a certain number (e.g., Y) of paging occasions after reception of page at 1302. The Y paging occasions serve as a hysteresis period after page reception. In one configuration, the type of page may be used to determine the hysteresis period.

FIG. 13B is a diagram 1350 illustrating yet another example of a method of avoiding perpetual collision between WWAN and D2D. Specifically, this method provides a set of rules for priority inversion based on page not received for a considerable time. If there has been no page for a considerable time, a timer starts to run in the background. The expiry of the timer triggers priority inversion for D2D. In one configuration, the background timer value is based on application priority or other mechanisms.

In this example, as soon as a D2D and WWAN collision is detected at 1352, a background timer (e.g., Time_collision initialized to 0) is started and NBR for the outage of D2D operation is computed. As soon as the timer expires (e.g., Time_collision exceeds a timer threshold) or NBR exceeds an NBR threshold, priority inversion is triggered for next colliding paging occasion (e.g., 1354) and D2D is prioritized over WWAN at that paging occasion (e.g., 1354).

In one configuration, D2D discontinuous reception (DRX) gaps and the discovery period may be relatively prime to avoid perpetual collision. If the DRX gaps and discovery period are relatively prime, the chances of the discovery period falling at the same offset from colliding WWAN procedures is lesser than the non-prime case. This may be a low cost option to spread the collision amongst different codes that need D2D TX/RX.

In one configuration, SIB 19 may be configured to change the offset every once-in-a-while. However, such a configuration may be a costly option, as the configuration involves flooding the network with pages once every certain number of occasions. In one configuration, multiple TX pools or RX pools may be defined. In such a configuration, network intervention may be needed to allocate multiple pools and a UE may deal with multiple pools even for low number of codes to transmit, leading to either redundancy or increased complexity for collisions.

In one configuration, concurrent chain usage may be used to avoid perpetual WWAN and D2D collision. In such a configuration, multiple RX/TX chains may be available and concurrency may be supported. In one configuration, enabling concurrent chains may incur no penalty with respect to the performance of the UE.

Figure 14:
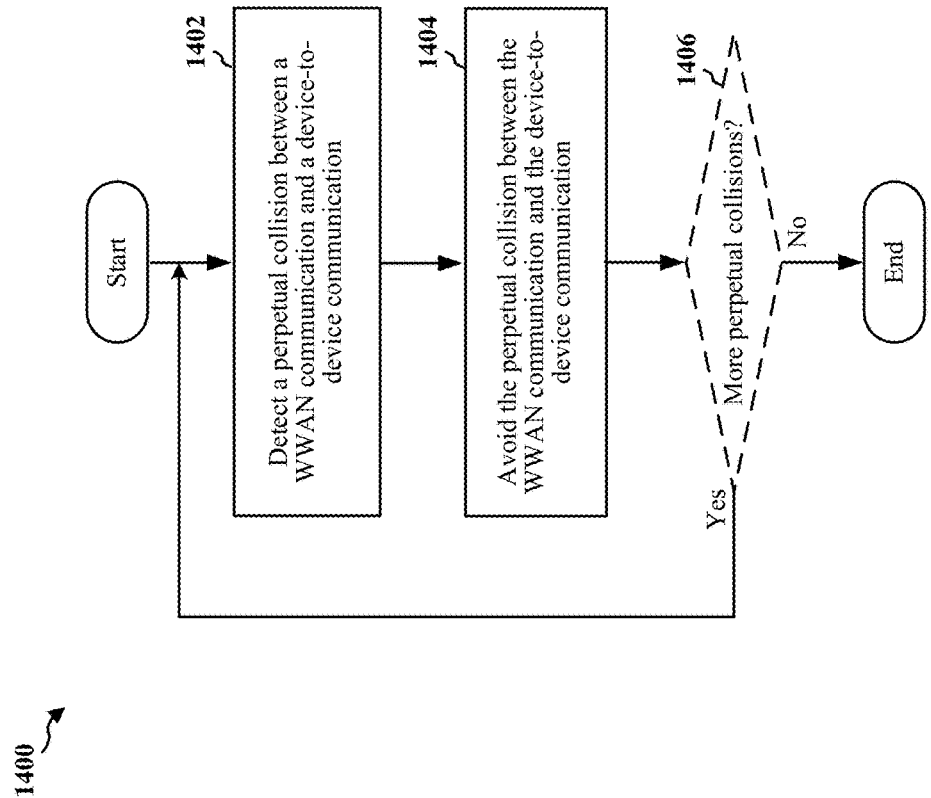
FIG. 14 is a flowchart of a method of avoiding perpetual WWAN and D2D collision.

FIG. 14 is a flowchart 1400 of a method of avoiding perpetual WWAN and D2D collision. The method may be performed by a UE (e.g., the UE 104, 350, 464, 466, 468, 470, or the apparatus 1502/1502'). At 1402, the UE detects a perpetual collision between a WWAN communication and a device-to-device communication.

At 1404, the UE avoids the perpetual collision between the WWAN communication and the device-to-device communication. In one configuration, to avoid the perpetual collision, the UE determines an offset of a discovery period relative to a particular subframe based on a random number, as described above with reference to FIG. 12. In one configuration, the random number may be provided by a Coordinated Universal Time (UTC) time counter. In one configuration, to avoid the perpetual collision, the UE makes a DRX gap and a discovery period relatively prime, e.g., by adjusting the length of the DRX gap and/or the discovery period.

In one configuration, to avoid the perpetual collision, the UE detects a page at a first paging occasion, and prioritizes the device-to-device communication over the WWAN communication at a second paging occasion, which is several paging occasions after the first paging occasion, as described above with reference to FIG. 13A. In one configuration, to avoid the perpetual collision, the UE starts a background timer in response to the detecting of the perpetual collision, and prioritizes the device-to-device communication over the WWAN communication when the background timer expires, as described above with reference to FIG. 13B. In one configuration, to avoid the perpetual collision, the UE computes a block rate metric for the device-to-device communication in response to the detecting of the perpetual collision, and prioritizes the device-to-device communication over the WWAN communication when the block rate metric exceeds a threshold, as described above with reference to FIG. 13B.

At 1406, the UE may optionally determine whether there are more perpetual collisions. If there are more perpetual collisions, the UE loops back to 1402. If there is no more perpetual collisions, the UE terminates the method.

Figure 15:
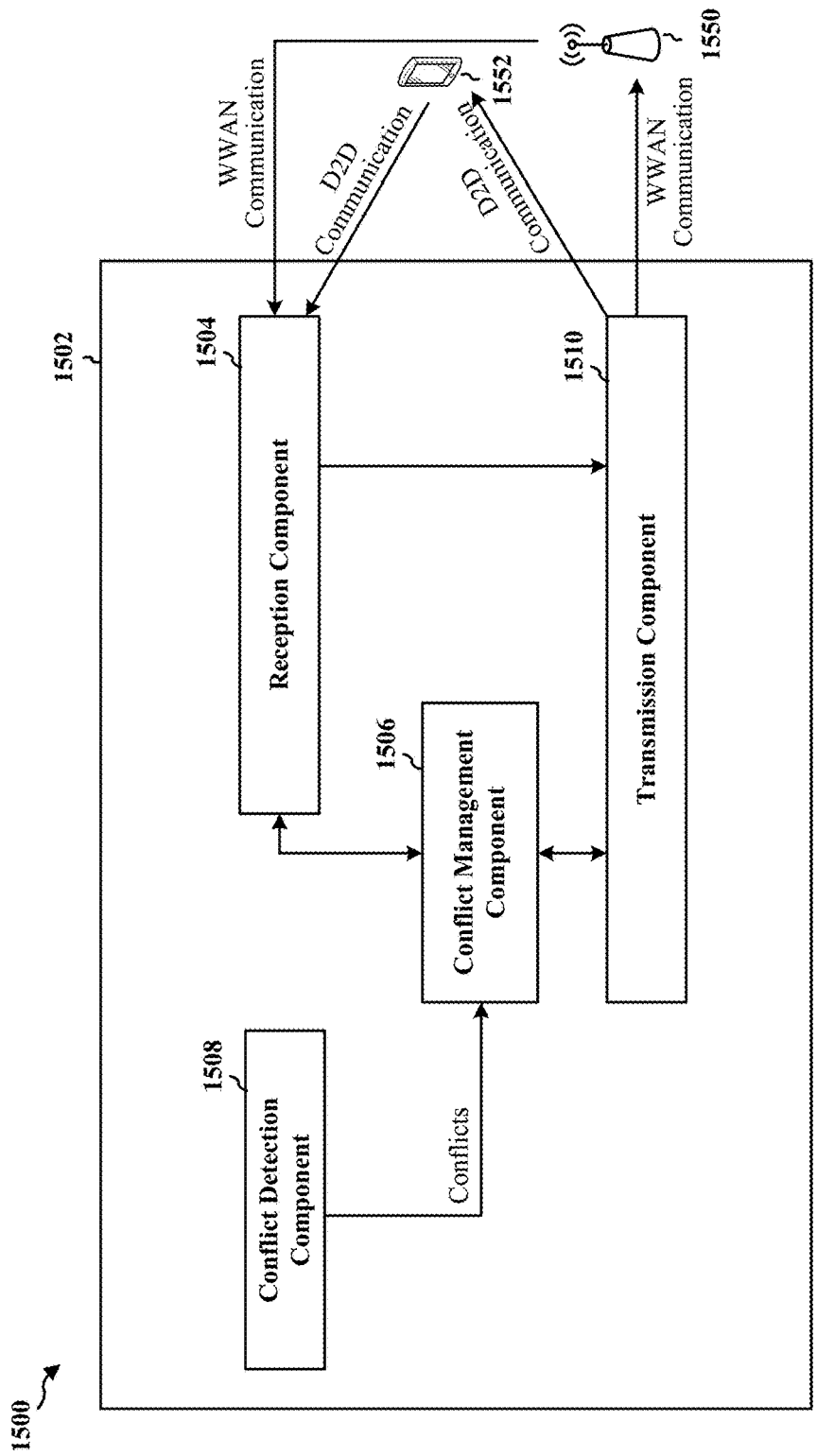
FIG. 15 is a conceptual data flow diagram illustrating the data flow between different means/components in an exemplary apparatus.

FIG. 15 is a conceptual data flow diagram 1500 illustrating the data flow between different means/components in an exemplary apparatus 1502. The apparatus may be a UE. The apparatus 1502 may include a reception component 1504 that receives WWAN communication from an eNB 1550 and D2D communication from a UE 1552.

The apparatus 1502 may include a transmission component 1510 that transmits D2D communication to the UE 1552 and WWAN communication to the eNB 1550. The reception component 1504 and the transmission component 1510 may work together to coordinate the communications of the apparatus 1502.

The apparatus 1502 may include a conflict detection component 1508 that detects time domain conflicts, including time domain conflicts between two or more D2D operations and time domain conflicts between WWAN operations and D2D operations. In one configuration, the conflict detection component 1508 may detect perpetual WWAN and D2D collisions. In one configuration, the conflict detection component 1508 may perform operations described above with reference to 818, 904, 912, 1004, 1402, or 1406.

The apparatus 1502 may include conflict management component 1506 that resolves time domain conflicts detected by the conflict detection component 1508 and controls the reception component 1504 and the transmission component 1510 to act accordingly. In one configuration, the conflict management component 1506 may perform operations described above with reference to 802-816, 902, 906, 908, 910, 1002, 1006, or 1404. In one configuration, data may be sent via arrows for all arrows connecting the components.

The apparatus may include additional components that perform each of the blocks of the algorithm in the aforementioned flowcharts of FIGS. 8-10 and 14. As such, each block in the aforementioned flowcharts of FIGS. 8-10 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
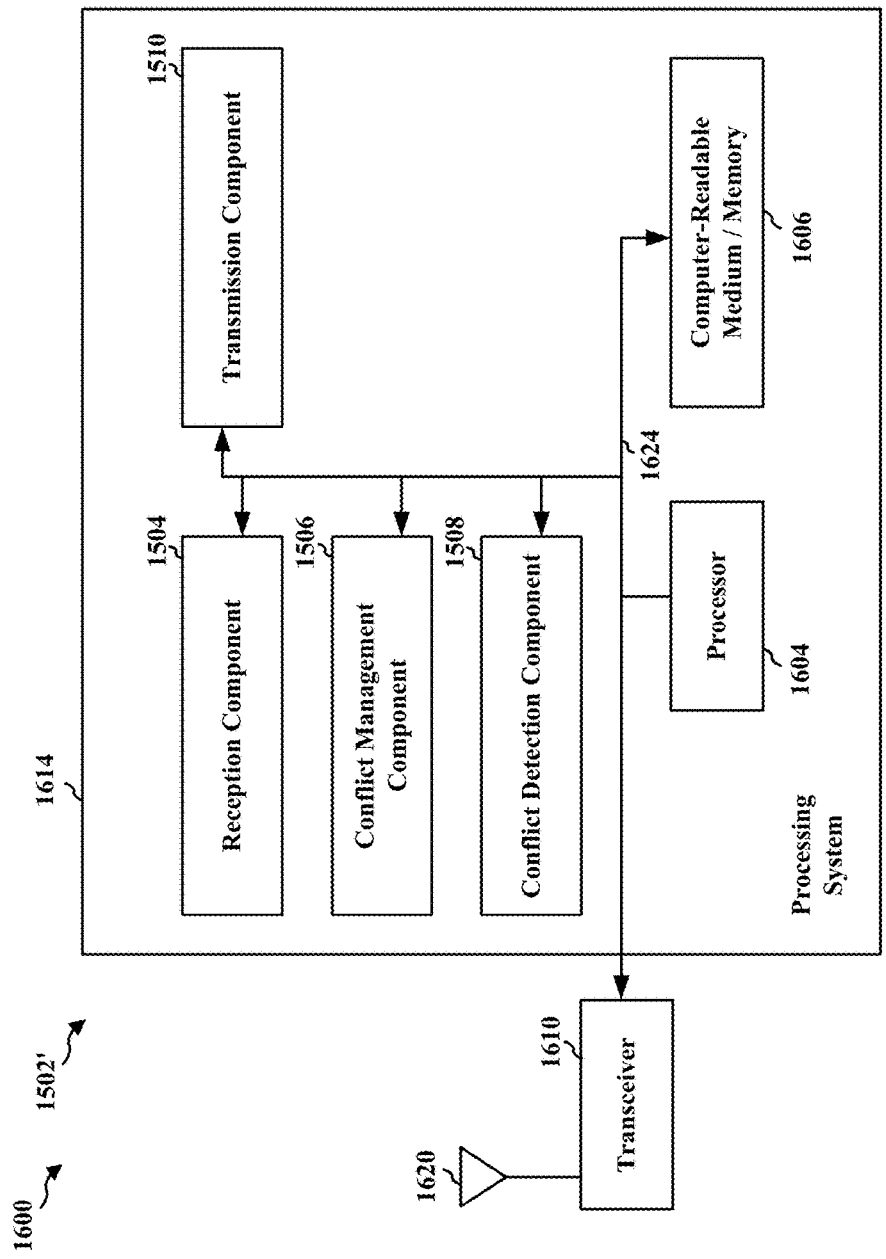
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1510, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1508, 1510. The components may be software components running in the processor 1604, resident/stored in the computer readable medium/memory 1606, one or more hardware components coupled to the processor 1604, or some combination thereof. The processing system 1614 may be a component of the UE 350 and may include the memory 360 and/or at least one of the TX processor 368, the RX processor 356, and the controller/processor 359.

In one configuration, the apparatus 1502/1502' for wireless communication includes means for computing a first block rate metric for a first device-to-device communication on a first frequency and a second block rate metric for a second device-to-device communication on a second frequency. In one configuration, the means for computing a first block rate metric and a second block rate metric may perform operations described above with reference to 1002 of FIG. 10. In one configuration, the means for computing a first block rate metric and a second block rate metric may be the conflict management component 1506 or the processor 1604.

In one configuration, the apparatus 1502/1502' may include means for detecting a time-domain conflict between the first device-to-device communication on the first frequency and the second device-to-device communication on the second frequency. In one configuration, the means for detecting a time-domain conflict may perform operations described above with reference to 1004 of FIG. 10. In one configuration, the means for detecting a time-domain conflict may be the conflict detection component 1508 or the processor 1604.

In one configuration, the apparatus 1502/1502' may include means for prioritizing the first device-to-device communication on the first frequency and the second device-to-device communication on the second frequency based on the first block rate metric and the second block rate metric. In one configuration, the means for prioritizing the first device-to-device communication on the first frequency and the second device-to-device communication on the second frequency based on the first block rate metric and the second block rate metric may perform operations described above with reference to 1006 of FIG. 10. In one configuration, the means for prioritizing the first device-to-device communication on the first frequency and the second device-to-device communication on the second frequency based on the first block rate metric and the second block rate metric may be the conflict management component 1506 or the processor 1604.

In one configuration, the apparatus 1502/1502' may include means for performing one of the first device-to-device communication on the first frequency or the second device-to-device communication on the second frequency that has a higher priority during subframes in which the time-domain conflict occurs. In one configuration, the means for performing one of the first device-to-device communication on the first frequency or the second device-to-device communication on the second frequency that has a higher priority during subframes in which the time-domain conflict occurs may perform operations described above with reference to 1008 of FIG. 10. In one configuration, the means for performing one of the first device-to-device communication on the first frequency or the second device-to-device communication on the second frequency that has a higher priority during subframes in which the time-domain conflict occurs may be the transceiver 1610, the one or more antennas 1620, the reception component 1504, the transmission component 1510, or the processor 1604.

In one configuration, the apparatus 1502/1502' may include means for abstaining from performing one of the first device-to-device communication on the first frequency or the second device-to-device communication on the second frequency that has a lower priority during subframes in which the time-domain conflict occurs. In one configuration, the means for abstaining from performing one of the first device-to-device communication on the first frequency or the second device-to-device communication on the second frequency that has a lower priority during subframes in which the time-domain conflict occurs may perform operations described above with reference to 1010 of FIG. 10. In one configuration, the means for abstaining from performing one of the first device-to-device communication on the first frequency or the second device-to-device communication on the second frequency that has a lower priority during subframes in which the time-domain conflict occurs may be the transceiver 1610, the one or more antennas 1620, the reception component 1504, the transmission component 1510, or the processor 1604.

In one configuration, the apparatus 1502/1502' may include means for detecting a perpetual collision between a WWAN communication and a device-to-device communication. In one configuration, the means for detecting a perpetual collision between a WWAN communication and a device-to-device communication may perform operations described above with reference to 1402 of FIG. 14. In one configuration, the means for detecting a perpetual collision between a WWAN communication and a device-to-device communication may be the conflict detection component 1508 or the processor 1604.

In one configuration, the apparatus 1502/1502' may include means for avoiding the perpetual collision between the WWAN communication and the device-to-device communication. In one configuration, the means for avoiding the perpetual collision between the WWAN communication and the device-to-device communication may perform operations described above with reference to 1404 of FIG. 14. In one configuration, the means for avoiding the perpetual collision between the WWAN communication and the device-to-device communication may be the conflict detection component 1508 or the processor 1604.

In one configuration, the means for avoiding the perpetual collision between the WWAN communication and the device-to-device communication may be configured to determine an offset of a discovery period relative to a particular subframe based on a random number. In one configuration, the means for avoiding the perpetual collision between the WWAN communication and the device-to-device communication may be configured to detect a page at a first paging occasion and prioritize the device-to-device communication over the WWAN communication at a second paging occasion. The second paging occasion may be a plurality of paging occasions after the first paging occasion.

In one configuration, the means for avoiding the perpetual collision between the WWAN communication and the device-to-device communication may be configured to start a background timer in response to the detecting of the perpetual collision and prioritize the device-to-device communication over the WWAN communication when the background timer expires. In one configuration, the means for avoiding the perpetual collision between the WWAN communication and the device-to-device communication may be configured to compute a block rate metric for the device-to-device communication in response to the detecting of the perpetual collision and prioritize the device-to-device communication over the WWAN communication when the block rate metric exceeds a threshold. In one configuration, the means for avoiding the perpetual collision between the WWAN communication and the device-to-device communication may be configured to make a DRX gap and a discovery period relatively prime.

The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   computing a first block rate metric for a first device-to-device communication on a first frequency and a second block rate metric for a second device-to-device communication on a second frequency, wherein the first block rate metric or the second block rate metric is a cumulative measure over a period of time of a number of resource blocks that have been assigned but are lost for use by the respective first device-to-device communication or the second device-to-device communication due to time-domain conflicts between the first device-to-device communication and the second device-to-device communication, wherein the number of resource blocks that have been assigned but are lost for use changes over the period of time;
   detecting a time-domain conflict between the first device-to-device communication on the first frequency and the second device-to-device communication on the second frequency; and
   prioritizing the first device-to-device communication on the first frequency and the second device-to-device communication on the second frequency based on the first block rate metric and the second block rate metric.

2. The method of claim 1, wherein the first device-to-device communication is a device-to-device transmit operation and the second device-to-device communication is a device-to-device receive operation.

3. The method of claim 2, wherein the device-to-device transmit operation on the first frequency is prioritized over the device-to-device receive operation on the second frequency when the first block rate metric is greater than or equal to a threshold.

4. The method of claim 2, wherein the device-to-device receive operation on the second frequency is prioritized over the device-to-device transmit operation on the first frequency when the first block rate metric is less than the threshold.

5. The method of claim 1, wherein the first device-to-device communication is a first device-to-device receive operation and the second device-to-device communication is a second device-to-device receive operation.

6. The method of claim 5, wherein the first device-to-device receive operation on the first frequency is prioritized over the second device-to-device receive operation on the second frequency when the first block rate metric is greater than the second block rate metric.

7. The method of claim 5, wherein one of the first device-to-device receive operation on the first frequency and the second device-to-device receive operation on the second frequency is randomly selected to prioritize over another one of the first device-to-device receive operation on the first frequency and the second device-to-device receive operation on the second frequency when the first block rate metric is equal to the second block rate metric.

8. The method of claim 1, further comprising:
   performing one of the first device-to-device communication on the first frequency or the second device-todevice communication on the second frequency that has a higher priority during subframes in which the time-domain conflict occurs; and abstaining from performing one of the first device-to-device communication on the first frequency or the second device-to-device communication on the second frequency that has a lower priority during subframes in which the time-domain conflict occurs.

9. The method of claim 1, wherein at least one of the first block rate metric or the second block rate metric is computed based on a number of resource blocks lost in eligible monitoring subframes for a device-to-device receive operation during a fixed period of time and a number of monitoring attempts for the device-to-device receive operation during the fixed period of time.

10. The method of claim 1, wherein one of the first block rate metric or the second block rate metric is computed based on a number of resource blocks lost in selected transmit subframes for a device-to-device transmit operation during a fixed period of time and a total number of the selected transmit subframes for the device-to-device transmit operation during the fixed period of time.

11. An apparatus for wireless communication, comprising:
a memory; and
at least one processor coupled to the memory and configured to:
compute a first block rate metric for a first device-to-device communication on a first frequency and a second block rate metric for a second device-to-device communication on a second frequency, wherein the first block rate metric or the second block rate metric is a cumulative measure over a period of time of a number of resource blocks that have been assigned but are lost for use by the respective first device-to-device communication or the second device-to-device communication due to time-domain conflicts between the first device-to-device communication and the second device-to-device communication, wherein the number of resource blocks that have been assigned but are lost for use changes over the period of time;
detect a time-domain conflict between the first device-to-device communication on the first frequency and the second device-to-device communication on the second frequency; and
prioritize the first device-to-device communication on the first frequency and the second device-to-device communication on the second frequency based on the first block rate metric and the second block rate metric.

12. The apparatus of claim 11, wherein the first device-to-device communication is a device-to-device transmit operation and the second device-to-device communication is a device-to-device receive operation.

13. The apparatus of claim 12, wherein the device-to-device transmit operation on the first frequency is prioritized over the device-to-device receive operation on the second frequency when the first block rate metric is greater than or equal to a threshold.

14. The apparatus of claim 12, wherein the device-to-device receive operation on the second frequency is prioritized over the device-to-device transmit operation on the first frequency when the first block rate metric is less than the threshold.

15. The apparatus of claim 11, wherein the first device-to-device communication is a first device-to-device receive operation and the second device-to-device communication is a second device-to-device receive operation.

16. The apparatus of claim 15, wherein the first device-to-device receive operation on the first frequency is prioritized over the second device-to-device receive operation on the second frequency when the first block rate metric is greater than the second block rate metric.

17. The apparatus of claim 15, wherein one of the first device-to-device receive operation on the first frequency and the second device-to-device receive operation on the second frequency is randomly selected to prioritize over another one of the first device-to-device receive operation on the first frequency and the second device-to-device receive operation on the second frequency when the first block rate metric is equal to the second block rate metric.

18. The apparatus of claim 11, wherein the at least one processor is further configured to:
perform one of the first device-to-device communication on the first frequency or the second device-to-device communication on the second frequency that has a higher priority during subframes in which the time-domain conflict occurs; and
abstain from performing one of the first device-to-device communication on the first frequency or the second device-to-device communication on the second frequency that has a lower priority during subframes in which the time-domain conflict occurs.

19. The apparatus of claim 11, wherein at least one of the first block rate metric or the second block rate metric is computed based on a number of resource blocks lost in eligible monitoring subframes for a device-to-device receive operation during a fixed period of time and a number of monitoring attempts for the device-to-device receive operation during the fixed period of time.

20. The apparatus of claim 11, wherein one of the first block rate metric or the second block rate metric is computed based on a number of resource blocks lost in selected transmit subframes for a device-to-device transmit operation during a fixed period of time and a total number of the selected transmit subframes for the device-to-device transmit operation during the fixed period of time.

* * * * *